United States Patent Office 3,427,221
Patented Feb. 11, 1969

3,427,221
CARBON-DIOXIDE COOLED, GRAPHITE-MODERATED NUCLEAR REACTOR
Peter Campion, Croft, Warrington, England, assignor to United Kingdom Atomic Energy Authority, London, England
No Drawing. Filed Nov. 14, 1966, Ser. No. 593,727
Claims priority, application Great Britain, Nov. 16, 1965, 48,719/65; Feb. 15, 1966, 6,675/66
U.S. Cl. 176—58    5 Claims
Int. Cl. G21c 15/28, 19/28

ABSTRACT OF THE DISCLOSURE

A carbon dioxide coolant circuit of a graphite-moderated nuclear reactor is provided with a catalyst bed containing nickel to promote the formation of methane from carbon monoxide and hydrogen in the coolant circuit to reduce the corrosive effects of the carbon dioxide coolant on the reactor graphite.

---

This invention relates to nuclear reactors and to the treatment of coolant therefor.

In carbon dioxide-cooled, graphite-moderated nuclear reactors reaction occurs between the graphite and the carbon dioxide under irradiation, resulting in corrosion of the graphite, and it is considered desirable in highly-rated reactors to add small amounts of methane to the coolant in order to inhibit the graphite-carbon dioxide reaction. Radiolysis of the carbon dioxide coolant still occurs however, three main products being carbon monoxide, water and hydrogen, and it is also considered desirable to provide plant for removing them from the coolant. Such plant is costly to install and operate.

According to the present invention there is incorporated in the coolant circuit of a carbon dioxide-cooled, graphite-moderated, nuclear reactor a catalyst to promote in the presence of excess carbon dioxide the reaction between carbon monoxide and hydrogen to produce methane.

The major methane producing reactions promoted by a catalyst are:

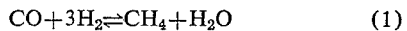
$$CO + 3H_2 \rightleftharpoons CH_4 + H_2O \tag{1}$$

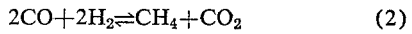
$$2CO + 2H_2 \rightleftharpoons CH_4 + CO_2 \tag{2}$$

Equation 2 represents the optimum methanation reaction for a reactor employing a carbon dioxide coolant. However some methanation may occur via Equation 1. In that reaction water is formed and, in the presence of a suitable catalyst, this water will react with further quantities of carbon monoxide in accordance with the equation.

$$CO + H_2O \rightleftharpoons CO_2 + H_2 \tag{3}$$

to produce further quantities of hydrogen which can react with more carbon monoxide to produce methane. The net result of Equations 1 and 3 occurring in this manner is then that Equation 2 represents the overall chemical reaction and, as stated above, this is desirable. To promote such a system therefore the catalysts to promote the reaction between carbon monoxide and hydrogen to produce methane may be either mixed with or preceded by a catalyst to promote the reaction between carbon monoxide and water to produce carbon dioxide and hydrogen (water gas shift reaction). As an alternative a methanation catalyst may be selected which will also promote the water gas shift reaction. In high temperature systems of the "advanced gas-cooled reactor" type the water/hydrogen ratio may be as high as 10 to 1 and promotion of the water gas shift reaction is important.

A suitable methanation catalyst is nickel on a support such as chromia or kieselguhr.

Ruthenium has not been found suitable. Laboratory experiments have shown that hydrogen present at 500 v.p.m. concentration in a 1 v/o carbon monoxide/carbon dioxide mixture can be converted to methane at greater than 90% efficiency over a nickel catalyst at 300° C. Water is similarly converted but at a lower efficiency (approximately 60%). The performance of a single bed of nickel-on-kieselguhr catalyst, operating at 300° C., space velocity 3500 h.$^{-1}$ and an inlet gas composition of 0.08 v/o $H_2$, 0.06 v/o $H_2O$, 0.1 v/o $CH_4$, 1 v/o $CO/CO_2$ has laso been tested using a simulated advanced gas-cooled reactor system in a materials testing reactor. Over experimental periods of one month, consistent methanation efficiencies of 50-60% have been observed. These efficiencies are considered to be quite satisfactory for maintaining the required $CH_4$ level in an A.G.R. For the water gas shift reaction laboratory experiments have shown that zinc/copper and chromium-promoted iron are efficient catalysts over the temperature range 250-350° C. using gas mixtures of nominal composition 0.1 v/o $H_2O$, 0.1 v/o $CH_4$, 1 v/o CO in $CO_2$. Using the mixed bed arrangement methanation efficiencies have been increased by up to 10%.

It has been found that with the above catalysts the reactions proceed most satisfactorily at 300° C. The catalyst or catalysts may therefore conveniently be installed at the outlet of the heat exchangers for the reactor coolant. Since nickel catalysts are poisoned by sulphur it may be desirable to desulphurise the reactor coolant just prior to the catalyst bed or beds. Zinc oxide may be used as an absorbent for this purpose.

By use of the invention the methane requirement for the reactor is reduced, dryers may be eliminated, and the load on the unit for removal of carbon monoxide—usually by combination with oxygen to form carbon dioxide—is cut down. Also instead of adding methane to reactor coolant to inhibit the graphite/$CO_2$ reaction water may be added, the water being converted to methane by passing through the catalyst or catalysts with reactor coolant which contains carbon monoxide. Further the catalysts may be used to control the carbon monoxide content of the reactor coolant by providing a quantitative oxygen feed into the system prior to a catalyst bed.

I claim:
1. A carbon dioxide-cooled, graphite-moderated nuclear reactor comprising a carbon dioxide coolant circuit, a catalyst bed located in said coolant circuit outside the reactor core, said catalyst bed containing nickel catalyst adapted to contact said carbon dioxide coolant to promote reaction between carbon monoxide and hydrogen present in said coolant to produce methane in said coolant circuit.

2. A carbon dioxide-cooled, graphite-moderated nuclear reactor according to claim 1 wherein the catalyst bed includes a catalyst adapted to promote the reaction between carbon monoxide and water to produce carbon dioxide and hydrogen.

3. A carbon dioxide-cooled, graphite-moderated nuclear reactor according to claim 1 wherein there are incorporated two catalyst beds in series, the first bed containing a catalyst adapted to promote the reaction between carbon monoxide and water to produce carbon dioxide and hydrogen, the second bed being the catalyst bed containing nickel.

4. A method of reducing the corrosive effects of the reactor coolant of a carbon-dioxide cooled, graphite-modified, nuclear reactor comprising the steps of contacting the carbon dioxide reactor coolant with catalyst provided in a catalyst bed located outside said reactor core and comprising nickel catalyst to promote reaction between carbon monoxide and hydrogen present in said coolant to produce methane in said coolant to thereby reduce the corrosive effects of said coolant on said graphite.

5. A method according to claim 4 including the step of adding water to said coolant and contacting the coolant containing said water with said catalyst to promote the formation of methane by reaction between said water and carbon monoxide present in said reactor coolant.

References Cited

UNITED STATES PATENTS

| 3,070,525 | 12/1962 | Davidson et al. | 176—58 X |
| 3,108,051 | 10/1963 | Lindstrom | 176—58 |
| 3,320,134 | 5/1967 | Sheppard et al. | 176—92 X |

REUBEN EPSTEIN, *Primary Examiner.*

U.S. Cl. X.R.

176—92